US012715066B2

(12) United States Patent
Hu et al.

(10) Patent No.: US 12,715,066 B2
(45) Date of Patent: Aug. 25, 2026

(54) BESSEL BEAM GENERATING APPARATUS AND METHOD THEREOF

(71) Applicant: Industrial Technology Research Institute, Hsinchu (TW)

(72) Inventors: Pin-Hao Hu, Kaohsiung City (TW); Fu-Lung Chou, Tainan City (TW); Yu-Chung Lin, Tainan City (TW); Min-Kai Lee, Tainan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1036 days.

(21) Appl. No.: 17/672,967

(22) Filed: Feb. 16, 2022

(65) Prior Publication Data

US 2023/0201960 A1 Jun. 29, 2023

(30) Foreign Application Priority Data

Dec. 23, 2021 (TW) ................................ 110148360

(51) Int. Cl.
*B23K 26/064* (2014.01)
*B23K 26/073* (2006.01)
(Continued)

(52) U.S. Cl.
CPC ........ *B23K 26/0648* (2013.01); *B23K 26/073* (2013.01); *B23K 26/082* (2015.10); *B23K 26/382* (2015.10)

(58) Field of Classification Search
None
See application file for complete search history.

(56) References Cited

U.S. PATENT DOCUMENTS

2018/0101015 A1* 4/2018 Hu ..................... G02B 27/0927
2019/0273025 A1 9/2019 Chen et al.

FOREIGN PATENT DOCUMENTS

CN 113534321 A 10/2021
TW I581886 5/2017
(Continued)

OTHER PUBLICATIONS

WO 2008110613 A1 (Ashkenasi et al.) Sep. 18, 2008 [retrieved on Mar. 21, 2025]. Retrieved from Foreign Image and Text database, translation by Clarivate Analytics (Year: 2008).*
(Continued)

*Primary Examiner* — Edward F Landrum
*Assistant Examiner* — Theodore J Evangelista
(74) *Attorney, Agent, or Firm* — WPAT, PC

(57) ABSTRACT

A method for generating Bessel beams includes the steps of: utilizing a light source to generate an incident beam to a phase modulation module; utilizing the phase modulation module to rectify the incident beam into a circular beam, and to modulate a phase of the circular beam into an asymmetric phase so as to form an asymmetric collimated circular beam provided to a scanning module; utilizing the scanning module to compensate the asymmetric collimated circular beam, and utilizing the asymmetric collimated circular beam to scan at different angles and then enter a focusing element; and, utilizing the focusing element to focus and interfere the asymmetric collimated circular beam into form a Bessel beam for machining.

26 Claims, 7 Drawing Sheets

(51) Int. Cl.

| | |
|---|---|
| ***B23K 26/082*** | (2014.01) |
| ***B23K 26/382*** | (2014.01) |

(56) References Cited

FOREIGN PATENT DOCUMENTS

| | | | |
|---|---|---|---|
| TW | I595265 | 8/2017 | |
| TW | I604907 | 11/2017 | |
| TW | I710421 | 11/2020 | |
| TW | I716216 | 1/2021 | |
| TW | I727732 | 5/2021 | |
| TW | I729222 | 6/2021 | |
| WO | WO-2008110613 A1 * | 9/2008 | ........... B23K 26/082 |
| WO | WO-2021037520 A1 * | 3/2021 | ............. B23K 26/06 |

OTHER PUBLICATIONS

WO 2021037520 A1 (Kumkar Malte) Mar. 4, 2021 [retrieved on Jul. 23, 2025]. Retrieved from Foreign Image and Text database, translation by Clarivate Analytics (Year: 2021).*

TW OA issued on Aug. 2, 2022.

Sukjoon Hong et al., "Study on the scanning system for deep focused beam by Axicon", 2009, pp. 93-95, IEEE.

Yanlong Yang et al., "Experimental analysis of focal fields in laser scanning fluorescence stereomicroscopy", Feb. 2014, vol. 8949, Proceedings of SPIE—The International Society for Optical Engineering.

Rieko Arimoto et al., "Imaging properties of axicon in a scanning optical system", Nov. 1, 1992, pp. 6653-6657, vol. 31 No. 31, Applied Optics.

* cited by examiner

BESSEL BEAM GENERATING APPARATUS AND METHOD THEREOF

CROSS REFERENCE TO RELATED APPLICATION

This application claims the benefits of Taiwan application Serial No. 110148360, filed Dec. 23, 2021, the disclosures of which are incorporated by references herein in its entirety.

TECHNICAL FIELD

The present disclosure relates in general to a Bessel beam generating apparatus and a method thereof, and more particularly to an apparatus and method for generating Bessel beams that utilizes a phase modulation module to modulate a phase of a circular beam into an asymmetric one, and a scanning module further to scan the resulted asymmetric circular beam at different angles.

BACKGROUND

In order to meet the demands of lighter, thinner and shorter 3C devices and high-capacity signal transmission such as high-frequency communication and 4K photography, through glass via (TGV) technology is widely used in related technical fields.

Regarding the through glass via technology, a laser beam is used to drill holes on a glass substrate, in which the laser beam is a Bessel beam. For a glass substrate with a size of 515 mm×510 mm and a thickness of 50 to 700 μm, the number of holes to be drilled can be up to 800,000. If the drilling hole diameter is 10 μm, the hole spacing is 50 μm, and the feed speed of the machining platform is 500 mm/sec, then 5,000 holes can be drilled in a second, and 170 minutes are required for this glass substrate to complete the drilling operation. Apparently, the production capacity is substantially affected.

The main reason for the slow drilling speed of the conventional through glass via technology is that the feeding pattern of the laser beam is "direct writing". The laser beam device moves along a linear path according to the preset hole spacing. During the movement, the laser beam must be positioned first, and then perform drilling by drilling a hole at a time. Only after the laser beam completes the drilling of a row, it can then move to another row to continue the drilling.

Accordingly, how to develop a Bessel beam generating apparatus and a method thereof, using a phase modulation module to modulate a phase of a circular beam into an asymmetric one, and then using a scanning module to scan the circular beam with the asymmetric phase at different angles, so as to improve the efficiency of the through glass via, is an urgent problem to the skill in the art.

SUMMARY

In one embodiment of this disclosure, a Bessel beam generating apparatus includes:

- a light source, configured for generating an incident beam;
- a phase modulation module, configured for rectifying the incident beam into a circular beam and further modulating a phase of the circular beam into an asymmetric phase so as to form an asymmetric collimated circular beam;
- a scanning module, configured for compensating the asymmetric collimated circular beam and utilizing the asymmetric collimated circular beam to scan at different angles; and
- a focusing element, configured for focusing and interfering the asymmetric collimated circular beam into a Bessel beam for machining.

In another embodiment of this disclosure, a method for generating Bessel beams includes the steps of:

- utilizing a light source to generate an incident beam to a phase modulation module;
- utilizing the phase modulation module to rectify the incident beam into a circular beam, and to modulate a phase of the circular beam into an asymmetric phase so as to form an asymmetric collimated circular beam provided to a scanning module;
- utilizing the scanning module to compensate the asymmetric collimated circular beam, and utilizing the asymmetric collimated circular beam to scan at different angles and then enter a focusing element; and
- utilizing the focusing element to focus and interfere the asymmetric collimated circular beam into form a Bessel beam for machining.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
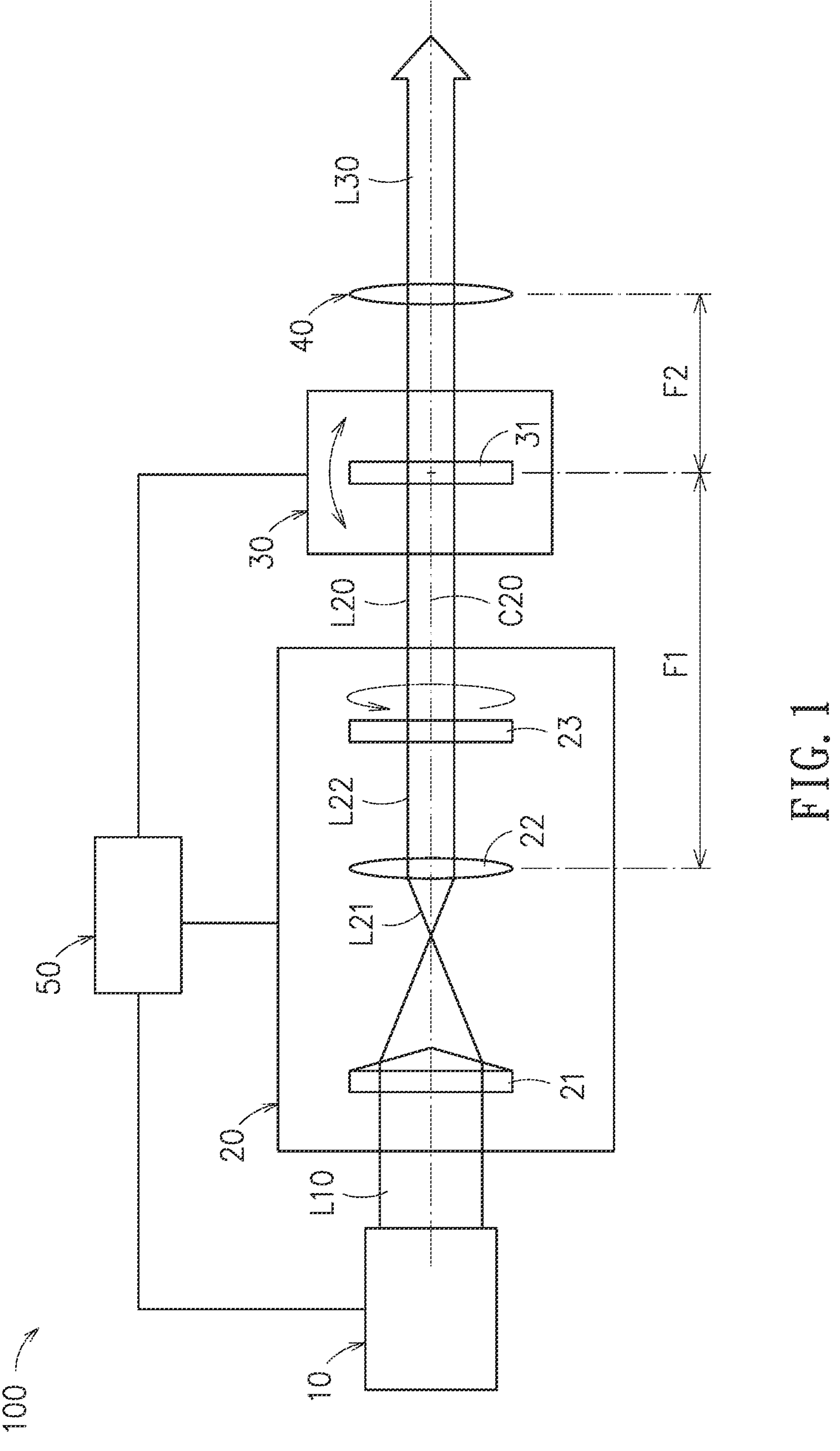
FIG. 1 is a schematic view of an embodiment of the Bessel beam generating apparatus in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to the embodiment of FIG. 1, a Bessel beam generating apparatus 100 includes a light source 10, a phase modulation module 20, a scanning module 30 and a focusing element 40.

The light source 10, configured for generating an incident beam L10, can be a laser light source or a coherent light source.

The phase modulation module 20 is configured for modulating the incident beam L10 into a corresponding circular beam and further for modulating a phase of the circular beam into an asymmetric phase so as to form an asymmetric collimated circular beam L20.

In the embodiment of FIG. 1, the phase modulation module 20 includes a conical lens 21, a collimation element 22 and a phase element 23. The incident beam L1 passes orderly through the conical lens 21, the collimation element 22 and the phase element 23.

After the incident beam L10 passes through the conical lens 21, the incident beam L10 would be rectified by the conical lens 21 into a diverse circular beam L21, refractive or diffractive.

The collimation element 22, configured for modulating the diverse circular beam L21 into a collimated circular beam L22, can be a plano-convex or biconvex spherical lens, single or multi-piece, and refractive or diffractive.

The phase element 23 is configured for modulating a phase of the collimated circular beam L22 into an asymmetric phase so as to form a corresponding asymmetric collimated circular beam L20.

The scanning module 30 can be a single-axis or dual-axis laser scanner device (or say, a Glavo scanning device). In the embodiment of FIG. 1, the scanning module 30 is a single-axis scanning module having a first scanning lens 31. By turning the first scanning lens 31 to different angles, the asymmetric collimated circular beam L20 can undergo various compensation scanning at different angles.

The phase modulation module 20 is rotated about an optical axis C20 of the asymmetric collimated circular beam L20. More precisely, the phase element 23 of the phase modulation module 20 is driven to rotate about the optical axis C20 of the asymmetric collimated circular beam L20. Thereupon, the asymmetric angle of the asymmetric collimated circular beam L20 formed by the phase modulation module 20 can match a desired scanning position of the scanning module 30. Namely, the rotational angle of the phase element 23 is to match a specific angle for corresponding compensation scanning of the scanning module 30. As the phase element 23 is rotated, a different scan range would be obtained.

The focusing element 40, configured for focusing and interfering the asymmetric collimated circular beam L20 into a corresponding Bessel beam L30 for machining, can be a plano-convex or biconvex spherical lens, single or multi-piece, and refractive or diffractive.

Referring to FIG. 1, in the single-axis scanning module 30, the distance between the collimation element 22 and the first scanning lens 31 is defined as a first distance F1, and the distance between the first scanning lens 31 and the focusing element 40 is defined as a second distance F2.

In order to keep a planar scan surface, the first scanning lens 31 can be disposed on a front focus plane of the focusing element 40; i.e., a front focus position of the focusing element 40 is at the first scanning lens 31. Thereupon, as the asymmetric collimated circular beam L20 passes through the focusing element 40, the telecentric characteristics can be obtained.

In addition, in order to keep the collimated circular light formation of the asymmetric collimated circular beam L20 after passing through the focusing element 40, the focus of the asymmetric collimated circular beam L20 can be disposed on the front focus plane at the second distance F2. Namely, after the collimated circular beam L22 passes through the focus of the collimation element 22, the first scanning lens 31 and the front focus plane at the second distance F2 are coincided.

Referring to FIG. 1, the Bessel beam generating apparatus 100 further includes a controller 50. The controller 50, connected with and thus controlling the light source 10, the phase modulation module 20 and the scanning module 30, can be a computer, a microprocessor, or any programmable calculation device.

Figure 2A:
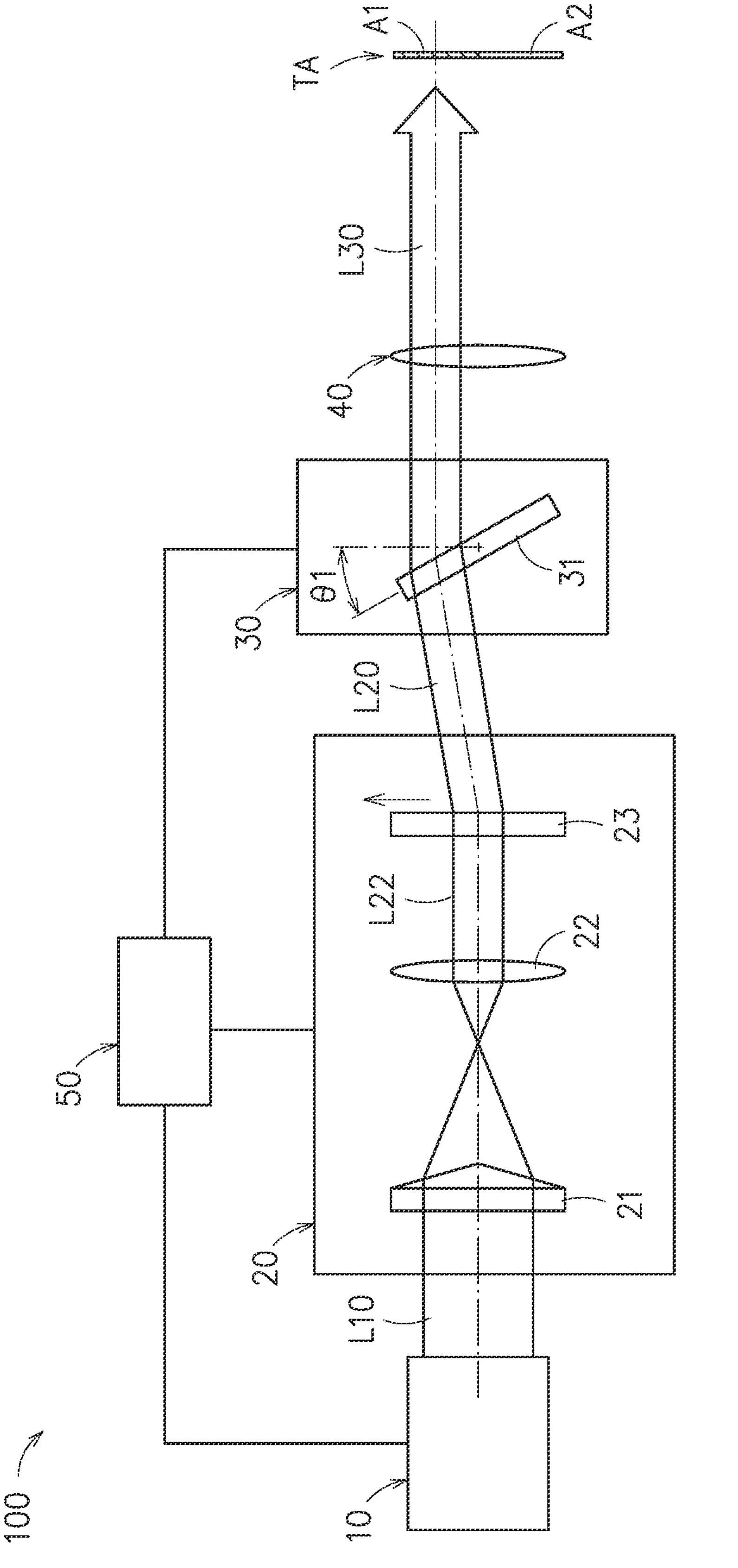
FIG. 2A and FIG. 2B demonstrate schematically different optical paths for the phase element of the single-axis scanning module of the Bessel beam generating apparatus of FIG. 1 at different phase-modulated angles for the compensation scanning.
Figure 2B:
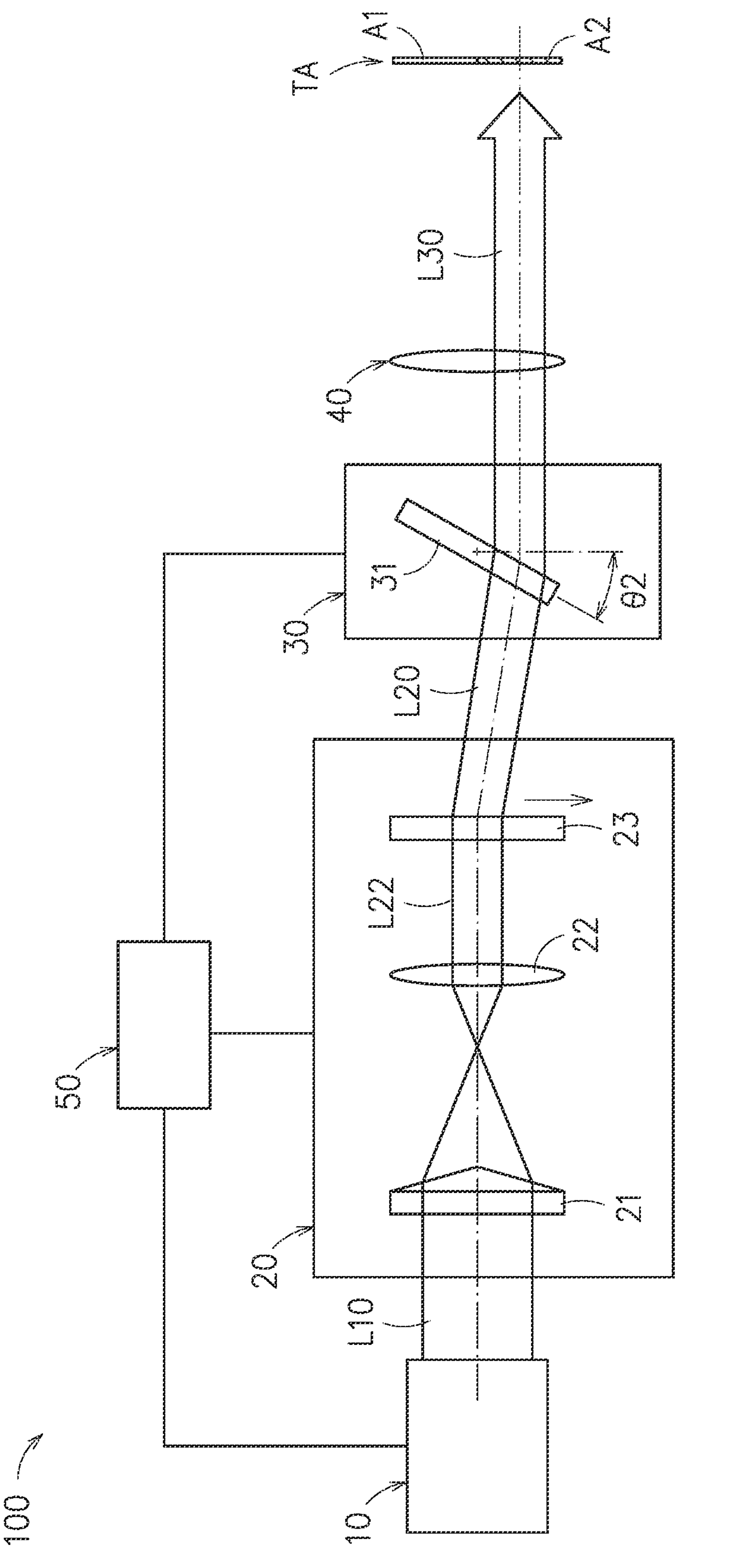

Referring to FIG. 2A and FIG. 2B, different optical paths for the phase elements of the single-axis scanning module of the Bessel beam generating apparatus of FIG. 1 at different phase-modulated angles in the compensation scanning are schematically demonstrated.

Referring to FIG. 2A, as the phase element 23 is posed at 0° and the scanning module 30 is turned to a compensation angle θ1, the scan compensation area would be A1; i.e., the machining range for the Bessel beam L30. Referring to FIG. 2B, as the phase element 23 is turned to pose at 180° for pairing the scanning module 30 at a compensation angle θ2, then the scan compensation area would be A2; i.e., the machining range for the Bessel beam L30.

By comparing FIG. 2A and FIG. 2B, whose angling of the phase element 23 are 0° and 180°, respectively, the formulated light patterns are symmetrical to each other. As shown in FIG. 2A and FIG. 2B, a vertical symmetric style is formed, but not limited thereto. In another embodiment, a horizontal symmetric style may be produced.

When the phase element 23 is rotated by 360°, then a total scan compensation area TA for machining by including the scan compensation areas A1, A2 of the Bessel beam L30 can be formed. In comparison to the conventional machining system, the associated machining range is only limited to one of the scan compensation areas A1 and A2, since the conventional machining system doesn't include the phase element 23 of this disclosure. Namely, by providing the single-axis scanning module 30 to the Bessel beam generating apparatus 100, the phase element 23 would contribute to provide at least twice machining ranges by comparing to the conventional machining system.

Figure 3:
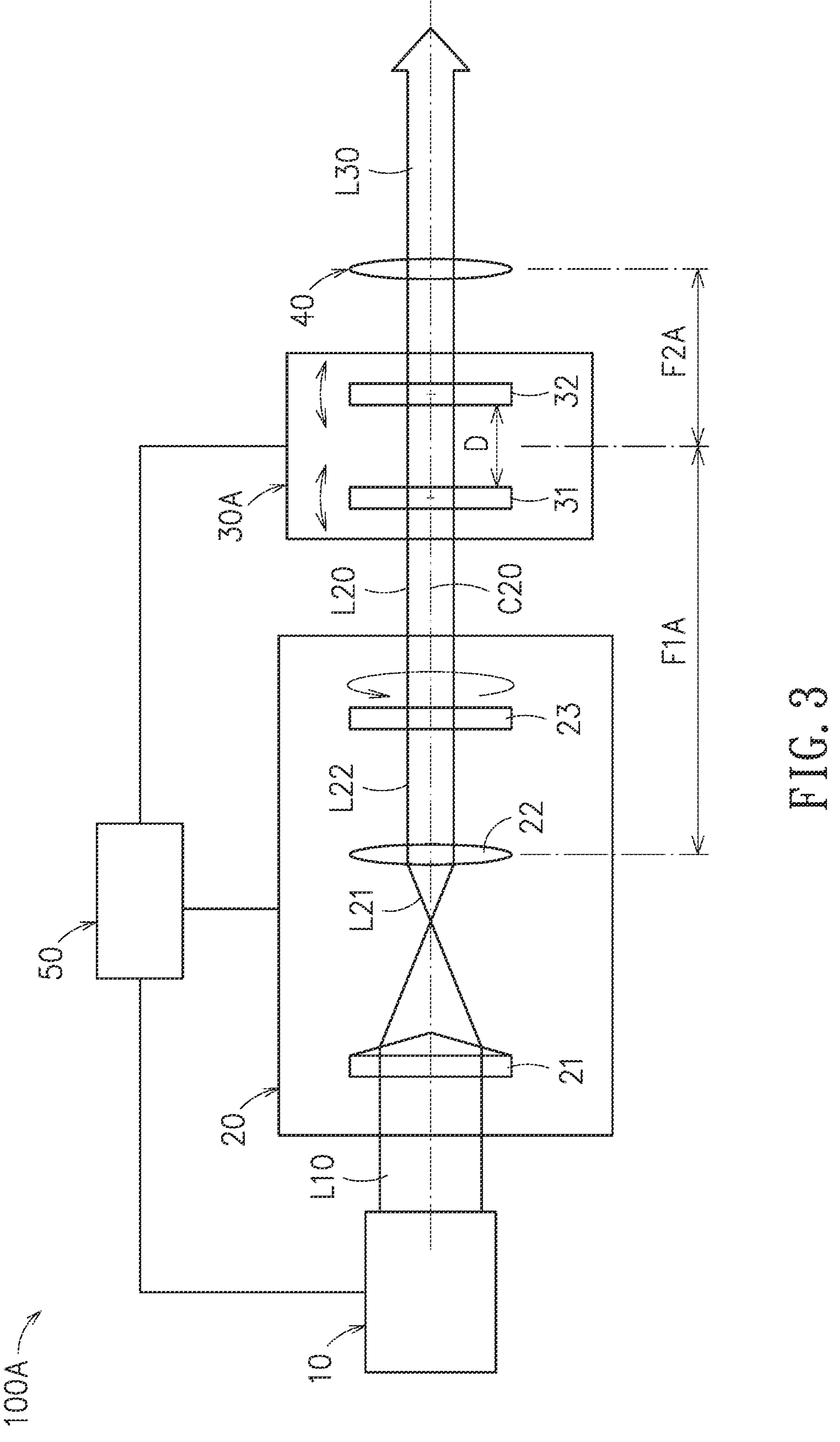
FIG. 3 is a schematic view of another embodiment of the Bessel beam generating apparatus in accordance with this disclosure.

Referring to the embodiment of FIG. 3, a Bessel beam generating apparatus 100A includes a light source 10, a phase modulation module 20, a scanning module 30A and a focusing element 40. The phase modulation module 20 includes a conical lens 21, a collimation element 22 and a phase element 23.

A major difference between embodiments of FIG. 3 and FIG. 1 is that, in this embodiment, the scanning module 30*a* is a dual-axis scanning module. In the embodiment of FIG. 3, the scanning module 30A is a dual-axis scanning module consisted of a first scanning lens 31 and a second scanning lens 32. By providing the first scanning lens 31 and the second scanning lens 32 to rotate and thus compensate the asymmetric collimated circular beam L20, then the resulted asymmetric collimated circular beam L20 can be used to scan at different angles.

In the dual-axis scanning module 30A, the first scanning lens 31 is spaced to the second scanning lens 32 by a distance D, the collimation element 22 is spaced from the first scanning lens 31 by a first distance F1A–D/2, and the second scanning lens 32 is spaced from the focusing element 40 by a second distance F2A–D/2.

A central point (i.e., at D/2) between the first scanning lens 31 and the second scanning lens 32 is positioned at the focus of the collimation element 22.

The front focus position of the focusing element 40 is at the central point (i.e., at D/2) between the first scanning lens 31 and the second scanning lens 32.

In order to modulate the phase of the collimated circular beam L22 passing through the collimation element 22, the phase element 23 is disposed after the collimation element 22, but in front of the scanning module 30A.

Referring to FIG. 4A to FIG. 4D, different optical paths for the phase element 23 of the dual-axis scanning module 30A of the Bessel beam generating apparatus 100A of FIG. 3 at different phase-modulated angles for the compensation scanning are illustrated schematically.

Figures 4A, 4B, 4C, 4D:
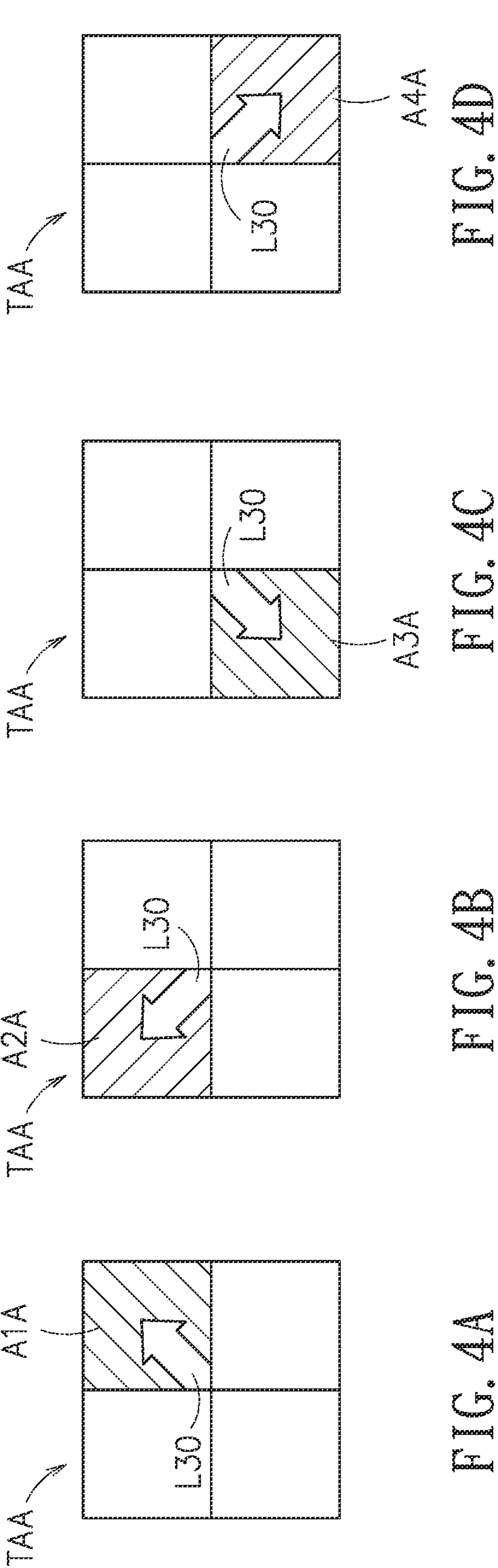
FIG. 4A to FIG. 4D demonstrate schematically different optical paths for the phase element of the dual-axis scanning module of the Bessel beam generating apparatus of FIG. 3 at different phase-modulated angles for the compensation scanning.

Referring to FIG. 3 and FIG. 4A, when the phase element 23 is posed at 45° (i.e., the arrow direction in FIG. 4A), then the scan compensation area (i.e., the machining range of the Bessel beam L30) with respect to this scanning module 30A is A1A.

Referring to FIG. 3 and FIG. 4B, when the phase element 23 is posed at 135° (i.e., the arrow direction in FIG. 4B), then the scan compensation area (i.e., the machining range of the Bessel beam L30) with respect to this scanning module 30A is A2A.

Referring to FIG. 3 and FIG. 4C, when the phase element 23 is posed at 225° (i.e., the arrow direction in FIG. 4C), then the scan compensation area (i.e., the machining range of the Bessel beam L30) with respect to this scanning module 30A is A3A.

Referring to FIG. 3 and FIG. 4D, when the phase element 23 is posed at 315° (i.e., the arrow direction in FIG. 4D), then the scan compensation area (i.e., the machining range of the Bessel beam L30) with respect to this scanning module 30A is A4A.

When the phase element 23 rotates 360°, the total scan compensation area TAA for machining would be the summation of the scan compensation areas A1A~A4A. In the conventional machining system, the associated machining range would be limited to one of the scan compensation areas A1A~A4A. The reason of different machining ranges is that the conventional machining system is not equipped with the phase element 23 of this disclosure. Namely, in the Bessel beam generating apparatus 100A having the dual-axis scanning module 30A, as disclosed above, the phase element 23 has enlarged the machining range at least by four times over the conventional machining system.

Referring to both FIG. 1 and FIG. 3, the phase modulation module 20 includes a conical lens 21, a collimation element 22 and a phase element 23, and the incident beam L1 passes orderly through the conical lens 21, the collimation element 22 and the phase element 23. That is, after the incident beam L1 passes through the conical lens 21 to form the circular beam, then the circular beam is rectified by passing through the collimation element 22 and further modulated in phasing by passing through the phase element 23. In addition, dispositions of the collimation element 22 and the phase element 23 can be switched to each other; i.e., to modulate the phase of the circular beam first, and then to rectify in linearity. Thereupon, the same light beam L20 can be outputted to achieve an expected performance.

Figure 5:
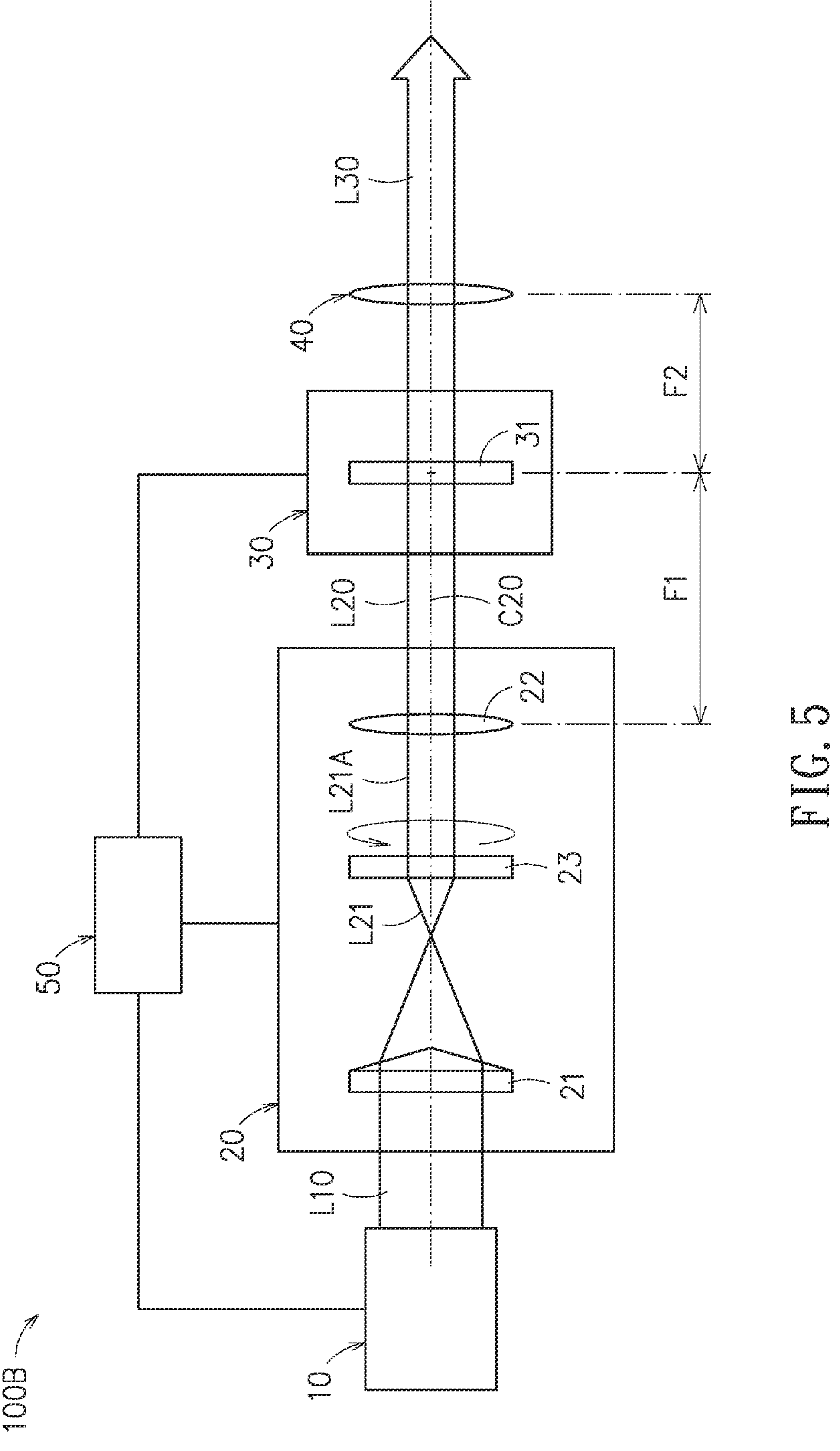
FIG. 5 is a schematic view of a further embodiment of the Bessel beam generating apparatus in accordance with this disclosure.

Referring to the embodiment of FIG. 5, a Bessel beam generating apparatus 100B includes a light source 10, a phase modulation module 20, a scanning module 30 and a focusing element 40. The phase modulation module 20 includes a conical lens 21, a collimation element 22 and a phase element 23.

After the incident beam L10 passes through the conical lens 21, the incident beam L10 would be rectified into a diverse circular beam L21.

Further, the phase element 23 is introduced to modulate the phase of the diverse circular beam L21 into an asymmetric one, so that the asymmetric diverse circular beam L21A can be formed.

Then, the collimation element 22 modulates the asymmetric diverse circular beam L21A into the asymmetric collimated circular beam L20.

The collimation element 22 is spaced from the first scanning lens 31 by a first distance F1, and the first scanning lens 31 is spaced from the focusing element 40 by a second distance F2. The front focus position of the focusing element 40 is disposed at the first scanning lens 31, and the focus of the asymmetric collimated circular beam L20 is lied on the front focus plane away by a distance of the second distance F2.

In another embodiment, the single-axis scanning module 30 of FIG. 5 can be replaced by the dual-axis scanning module 30A of FIG. 3.

In the embodiment shown in FIG. 5, the conical lens 21 and the phase element 23 can be integrated into a single piece, or replaced by a multi-beam diffraction optical element (DOE).

Figure 6:
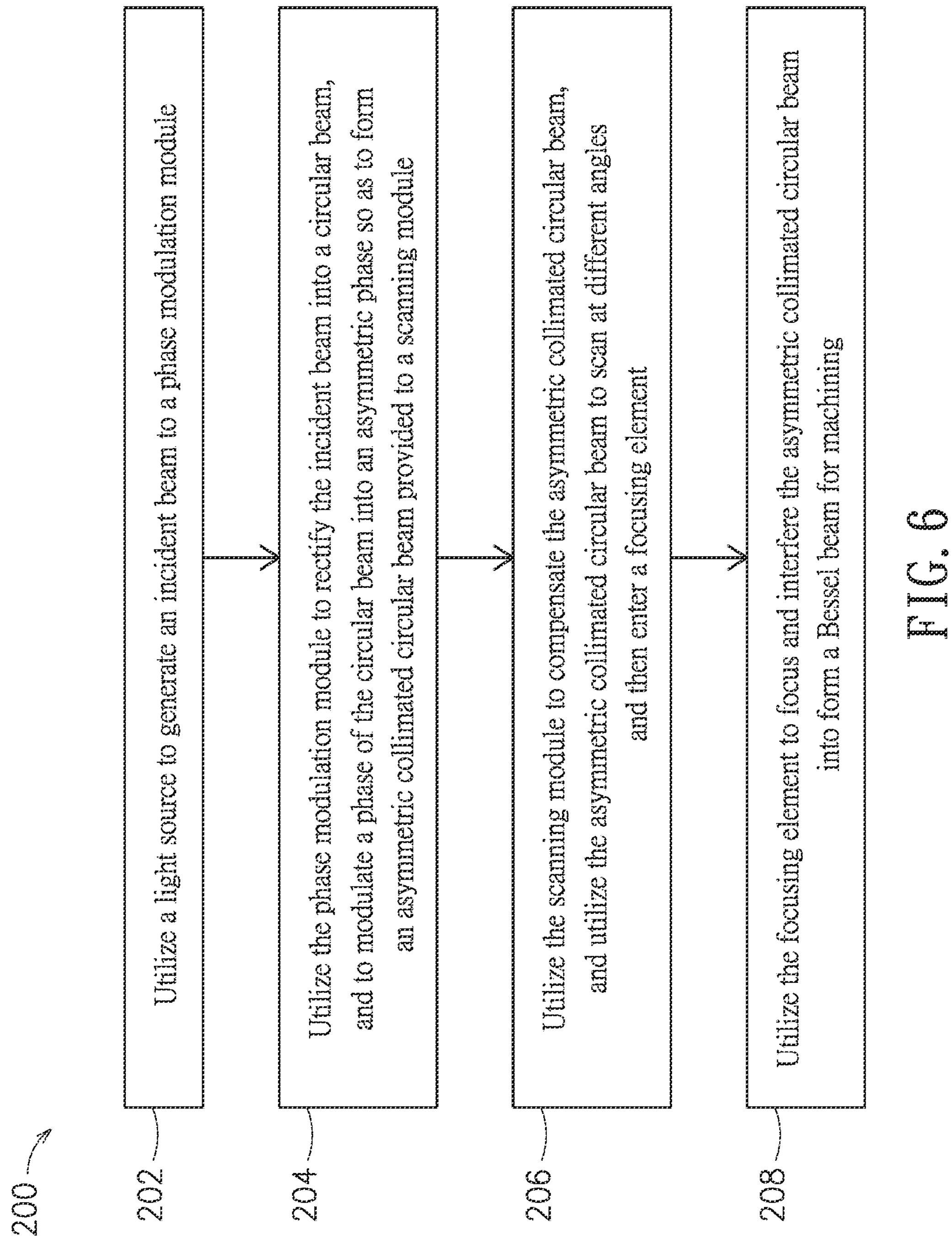
FIG. 6 is a schematic flowchart of an embodiment of the method for generating Bessel beams in accordance with this disclosure.

Referring to FIG. 6, by utilizing the Bessel beam generating apparatus of this disclosure, a method for generating Bessel beams 200 includes the following steps.

Step 202: Utilize the light source to provide an incident beam to a phase modulation module.

Step 204: Utilize the phase modulation module to rectify the incident beam into a circular beam and further to modulate the phase of the circular beam into an asymmetric phase, so that an asymmetric collimated circular beam can be formed and provide to a scanning module.

Step 206: Utilize the scanning module to compensate the asymmetric collimated circular beam, and the resulted asymmetric collimated circular beam is used to scan at different angles before entering a focusing element.

Step 208: Utilize the focusing element to focus and interfere the asymmetric collimated circular beam so as to form the Bessel beam for machining.

In summary, in the Bessel beam generating apparatus and a method thereof provided in this disclosure, the phase modulation module is utilized to modulate the phase of the circular beam into an asymmetric phase, and then a scanning module is utilized to use the asymmetric circular beam to perform scanning at different angles, such that the efficiency of the through glass via machining can be substantially enhanced.

In a practical testing using the Bessel beam generating apparatus and the associated method described above, to a glass substrate having a size of 515 mm×510 mm and a thickness of 50 to 700 μm, if a desired number of the drilled holes is 800,000, the drilled hole diameter is 10 μm, the hole spacing is 50 μm, the feed speed of the machining platform is 300 mm/sec, and the feed speed for both the phase modulation module and the scanning module is 2,500 mm/sec, then 10,000 holes can be drilled in every second. In comparison to the conventional direct write drilling, the machining speed of the scan-type drilling of this disclosure is twice of that of the conventional direct write drilling. To machine one aforesaid glass substrate, the apparatus and the method provided by this disclosure would take only 85 minutes to complete the drilling operation.

In another testing, following conditions are given to the conventional direct write machining:

Y-axis number: 500 mm/0.1 mm=5,000; Y-axis time: 0.5 sec*5,000=2,500 sec; X-axis number: 500 mm/0.1 mm=5,000; X-axis time: 1.5 sec*5,000=7,500 sec; and, total machining time=10,000 sec.

In the same testing following conditions are given to the Bessel beam generating apparatus and the associated method of this disclosure:

Y-axis number: 500 mm/0.1 mm=5,000; Y-axis time: 0.013 sec*5,000=65 sec; X-axis number: 500 mm/0.1 mm=5,000; X-axis time: 1.5 sec*5,000=7,500 sec; and, total machining time=7,565 sec.

Obviously, in comparison to the conventional direct write machining, the production speed according to the apparatus and method of this disclosure is significantly improved by:

$$(10{,}000-7{,}565)/10{,}000=24.35\%.$$

By providing the Bessel beam generating apparatus and the method thereof according to this disclosure, the marking on the fly can be provided to realize relative high-speed motions between the platform and both the phase modulation module and the scanning module, such that the high-speed positioning can be achieved within the entire servo stroke, and the field limitation upon the laser scan device can be diminished. In addition, the scan position synchronized output (Scan PSO) can connect directly the laser pulses, the phase modulation module and the scanning module, such that the laser can be triggered accurately, and so possible reaction time lag in compensation caused by motions of the scanning module can be avoided.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A Bessel beam generating apparatus, comprising:

a light source, configured to generate an incident beam;

a phase modulation module, configured to rectify the incident beam into a circular beam and further modulating a phase of the circular beam into an asymmetric phase to form an asymmetric collimated circular beam;

a scanning module, configured to compensate the asymmetric collimated circular beam and utilizing the asymmetric collimated circular beam to scan at different angles, wherein the scanning module is a dual-axis scanning module having a first scanning lens and a second scanning lens; and a focusing element, configured to focus and interfere the asymmetric collimated circular beam into a Bessel beam for machining;

wherein the phase modulation module includes:

a conical lens configured to rectify the incident beam into a diverse circular beam; and a collimation element configured to modulate the diverse circular beam into a collimated circular beam.

2. The Bessel beam generating apparatus of claim 1, wherein the light source is a laser light source or a coherent light source.

3. The Bessel beam generating apparatus of claim 1, wherein the phase modulation module includes:

a phase element, configured to modulate a phase of the collimated circular beam into an asymmetric phase to form the asymmetric collimated circular beam.

4. The Bessel beam generating apparatus of claim 3, wherein the conical lens is refractive or diffractive.

5. The Bessel beam generating apparatus of claim 3, wherein the collimation element is a plano-convex spherical lens or a biconvex spherical lens, single or multi-piece, and refractive or diffractive.

6. The Bessel beam generating apparatus of claim 1, wherein the phase modulation module includes:

a phase element, configured to modulate a phase of the diverse circular beam into an asymmetric phase to form an asymmetric diverse circular beam; and a wherein the collimation element is configured to modulate a phase of the asymmetric diverse circular beam into the asymmetric collimated circular beam.

7. The Bessel beam generating apparatus of claim 6, wherein the conical lens is refractive or diffractive.

8. The Bessel beam generating apparatus of claim 6, wherein the collimation element is a plano-convex spherical lens or a biconvex spherical lens, single or multi-piece, and refractive or diffractive.

9. The Bessel beam generating apparatus of claim 1, wherein the phase modulation module is driven to rotate about an optical axis of the asymmetric collimated circular beam, so as to have an asymmetric angle of the asymmetric collimated circular beam formed by the phase modulation module to match an expected scan position of the scanning module.

10. The Bessel beam generating apparatus of claim 1, wherein a front focus position of the focusing element is disposed at the first scanning lens.

11. The Bessel beam generating apparatus of claim 1, wherein a central position between the first scanning lens and the second scanning lens is coincided with a focus of the collimation element.

12. The Bessel beam generating apparatus of claim 11, wherein a front focus position of the focusing element is located at the central position between the first scanning lens and the second scanning lens.

13. The Bessel beam generating apparatus of claim 1, wherein the focusing element is a plano-convex spherical lens or a biconvex spherical lens, single or multi-piece, and refractive or diffractive.

14. A method for generating Bessel beams, comprising the steps of:

utilizing a light source to generate an incident beam to a phase modulation module;

utilizing the phase modulation module to rectify the incident beam into a circular beam, and to modulate a phase of the circular beam into an asymmetric phase so as to form an asymmetric collimated circular beam provided to a scanning module;

utilizing the scanning module to compensate the asymmetric collimated circular beam, and utilizing the asymmetric collimated circular beam to scan at different angles and then enter a focusing element, wherein the scanning module is a dual-axis scanning module having a first scanning lens and a second scanning lens; and utilizing the focusing element to focus and interfere the asymmetric collimated circular beam to form a Bessel beam for machining;

wherein the phase modulation module includes:

a conical lens configured to rectify the incident beam into a diverse circular beam; and a collimation element configured to modulate the diverse circular beam into a collimated circular beam.

15. The method for generating Bessel beams of claim 14, wherein the light source is a laser light source or a coherent light source.

16. The method for generating Bessel beams of claim 14, wherein the phase modulation module includes:

a phase element, configured for modulating a phase of the collimated circular beam into an asymmetric phase so as to form the asymmetric collimated circular beam.

17. The method for generating Bessel beams of claim 16, wherein the conical lens is refractive or diffractive.

18. The method for generating Bessel beams of claim 16, wherein the collimation element is a plano-convex spherical lens or a biconvex spherical lens, single or multi-piece, and refractive or diffractive.

19. The method for generating Bessel beams of claim 14, wherein the phase modulation module includes:

a phase element, configured for modulating a phase of the diverse circular beam into an asymmetric phase so as to form an asymmetric diverse circular beam;

wherein the collimation element is configured to modulate a phase of the asymmetric diverse circular beam into the asymmetric collimated circular beam.

20. The method for generating Bessel beams of claim 19, wherein the conical lens is refractive or diffractive.

21. The method for generating Bessel beams of claim 19, wherein the collimation element is a plano-convex spherical lens or a biconvex spherical lens, single or multi-piece, and refractive or diffractive.

22. The method for generating Bessel beams of claim 14, wherein the phase modulation module is driven to rotate about an optical axis of the asymmetric collimated circular beam, so as to have an asymmetric angle of the asymmetric collimated circular beam formed by the phase modulation module to match an expected scan position of the scanning module.

23. The method for generating Bessel beams of claim 14, wherein a front focus position of the focusing element is disposed at the first scanning lens.

24. The method for generating Bessel beams of claim 14, wherein a central position between the first scanning lens and the second scanning lens is coincided with a focus of the collimation element.

25. The method for generating Bessel beams of claim 24, wherein a front focus position of the focusing element is located at the central position between the first scanning lens and the second scanning lens.

26. The method for generating Bessel beams of claim 14, wherein the focusing element is a plano-convex spherical lens or a biconvex spherical lens, single or multi-piece, and refractive or diffractive.

* * * * *